Figure 4:
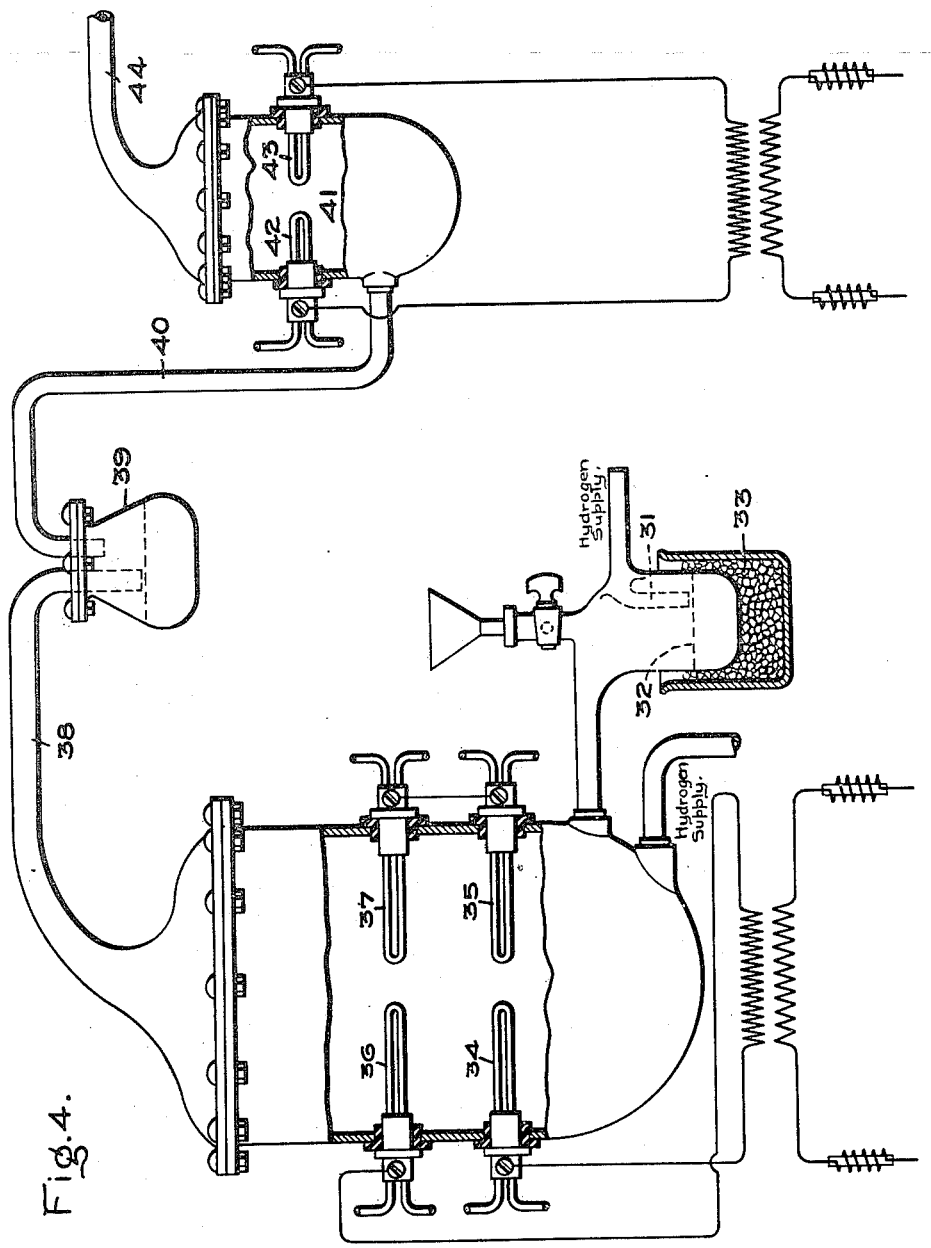

E. WEINTRAUB.
METHOD AND APPARATUS FOR REDUCING CHEMICAL COMPOUNDS.
APPLICATION FILED OCT. 27, 1909.
1,046,043.
Patented Dec. 3, 1912.
3 SHEETS—SHEET 1.
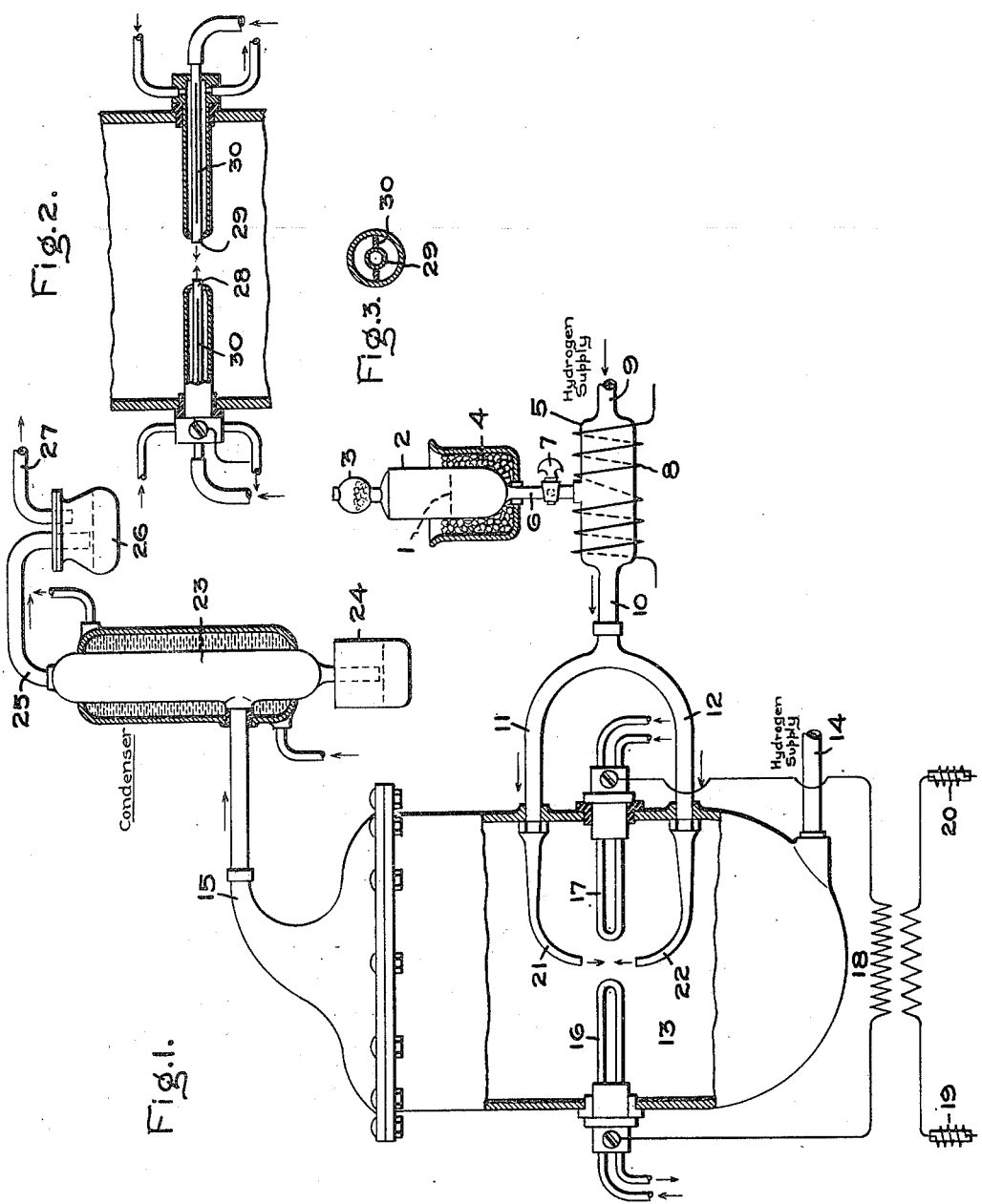
Witnesses:
Helen Oxford
W. J. Gartner
Inventor:
Ezechiel Weintraub,
by Albert G. Davis
His Attorney.

Inventor: Ezechiel Weintraub,

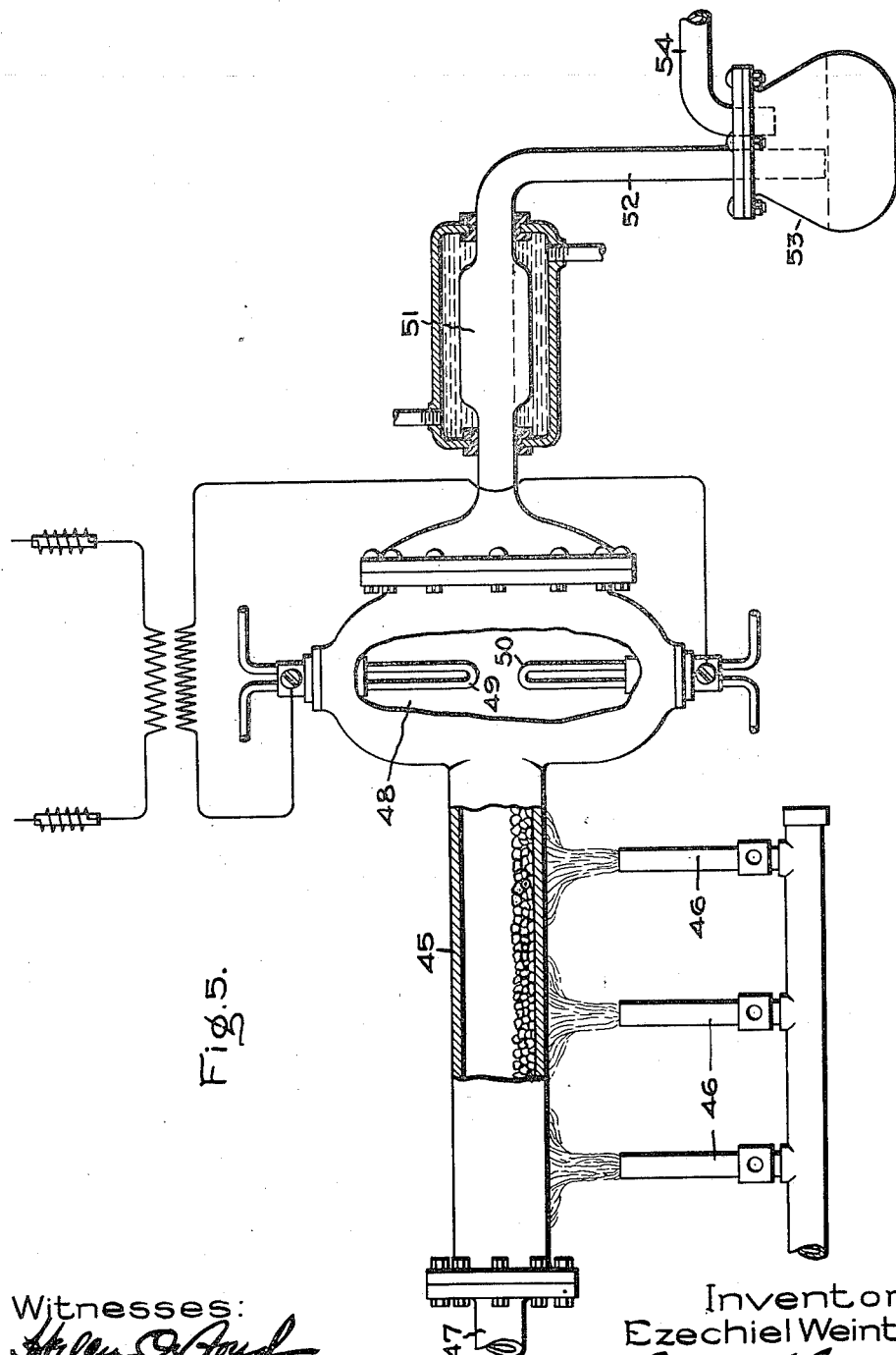

UNITED STATES PATENT OFFICE.

EZECHIEL WEINTRAUB, OF LYNN, MASSACHUSETTS, ASSIGNOR TO GENERAL ELECTRIC COMPANY, A CORPORATION OF NEW YORK.

METHOD AND APPARATUS FOR REDUCING CHEMICAL COMPOUNDS.

1,046,043.  Specification of Letters Patent.  Patented Dec. 3, 1912.

Application filed October 27, 1909. Serial No. 524,939.

*To all whom it may concern:*

Be it known that I, EZECHIEL WEINTRAUB, a citizen of the United States, residing at Lynn, county of Essex, State of Massachusetts, have invented certain new and useful Improvements in Methods and Apparatus for Reducing Chemical Compounds, of which the following is a specification.

My present invention relates to the art of reducing chemical compounds, and comprises a method whereby an electrical arc is utilized to effect chemical change, and to remove the reduction products from the zone in which that change is being carried out.

My invention also includes a novel form of apparatus whereby such a method can be practised.

Certain chemical compounds, as, for instance, chlorids and bromids, are to a certain extent reducible by hydrogen at high temperature, but the action is in many cases a reversible one, and hence the yield of the reaction may be very small. According to my present invention, the reverse reaction is prevented by rapid removal of the reduction product from the active zone.

My invention can be used in general for the reduction of chlorids and bromids which do not form solid sub-chlorids and sub-bromids, as, for instance, zirconium chlorid and boron chlorid, and, in some cases, can also be used even when a sub-chlorid forms, as is the case with titanium chlorid. I will describe the operation as applied to boron chlorid; but it should be understood that my invention is of a generic character, and can be applied to other materials.

In the drawings forming part of this specification, Figure 1 is an elevation, somewhat diagrammatic, of one form of apparatus for carrying out my invention; Fig. 2 is a fragmental view of a modified form of apparatus for introducing the reaction mixture into the arc; Fig. 3 is a detail view, being a cross section of one of the electrodes of Fig. 2; Fig. 4 illustrates a modified form of apparatus for carrying out the invention; and Fig. 5 illustrates an apparatus adapted for the reduction of chlorids somewhat less volatile.

Boron chlorid is a colorless liquid, boiling at about room temperature. It may be prepared by passing chlorin over crude boron and redistilling the product over copper, which is quicker and more effective than the usual shaking with mercury. As a reducing agent for the boron chlorid, I use pure, dry hydrogen, and as a means for effecting the necessary temperature, I use an electrical arc, maintained between suitable electrodes. But in addition to this, the apparatus is so arranged that the arc blast drives the solid reduction product, namely, boron, out of the active zone and deposits it on the walls of the apparatus and on the electrodes. This is the only solid product present, the three other substances, boron chlorid, hydrogen and hydrochloric acid, being all gaseous, are allowed to pass on to an absorbing or condensing chamber. This reaction differs from any other reaction heretofore carried out in an electric arc in having the desired reaction product in solid form, all the other substances present being gaseous. This is especially favorable, both for the removal of the desired product, which is effected by the arc blast itself, and for the production of an absolutely pure product.

The functions of the arc in removing the solid reduction product from the heated zone will be understood by appreciating that the emanations from the cathode spot move at high velocity and start the solid reduction productions at high velocity. These velocities are, no doubt, very much higher than that of the slow moving gas.

In the apparatus illustrated in Fig. 1, the liquid boron chlorid 1 is contained in a glass or copper vessel 2, which is separated from the atmosphere by means of a small bulb 3 containing calcium chlorid for the absorption of moisture. The vessel 2 is surrounded by a refrigerating material, such as the ice bath 4 to prevent the vaporization of the boron chlorid. The boron chlorid is introduced into the chamber 5 by means of a tube 6 having a stop cock 7. The chamber 5 may be heated if desired in any suitable manner, as by means of an electrical coil 8. A small quantity of the liquid chlorid is introduced at intervals into the chamber 5, where it is vaporized and the vapor carried away with a stream of hydrogen entering by the tube 9. The mixture of hydrogen and boron chlorid vapor leaving the chamber 5 through an exit tube 10 passes into the two branch tubes 11 and 12, which carry the mixture into the main arc chamber 13. This chamber is made of glass or copper, or other suitable material, and is provided with an inlet tube 14 for a supply of hydrogen, and with an outlet tube 15, through which the unused hydrogen and boron chlorid, as well as the hydrochloric acid forming as a by-product of the reaction, are led to other parts of the apparatus. Within the arc chamber 13 project the electrodes 16, 17, each consisting of copper tubing doubled on itself and cooled internally by a stream of water. For the sake of simplicity, the water supply pipes have been merely indicated in the drawing. Only one pair of electrodes is shown in the drawing, though more can be used in a single arc chamber if desired. An alternating current arc is preferably used, the current being supplied as indicated from a transformer 18, the primary of which is in circuit with suitable reactance coils 19, 20. The mixture of hydrogen and boron chlorid is introduced directly into the hot zone of the arc by means of the nozzles 21, 22 of refractory material such as silica. The reduction of the chlorid by hydrogen is effected according to the following treatment:

$$BCl_3 + 3H = 3HCl + B.$$

The arc blast throws the solid particles of the reduced boron out of the hot zone against the walls of the arc chambers and against the electrodes themselves, and the hydrochloric acid gas is carried along with the hydrogen and any reduced boron chlorid toward the upper part of the arc chamber, where it is removed by the tube 15. The boron deposited on the electrodes themselves is fused by the heat of the arc, so that a part of the boron is yielded directly as a homogeneous fused product. The arc then runs between two boron electrodes, the boron in some cases dropping off after having grown to a certain size, and another fused deposit of boron forming on the electrode. In this connection, the choice of the electrode material is of great importance. It must have no affinity whatever for the reduction product, so as not to combine with the product depositing and melting on it; and, secondly, it must not electrically disintegrate and mix with the powdered product. I have found that in the case of boron, copper fulfils these conditions perfectly; silver and gold also act satisfactorily. If a second arc is arranged like the first and in series with it, it will act on any reduced boron chlorid passing the first arc. The mixture of gases coming from the main arc chamber 13, and consisting of hydrogen, hydrochloric acid gas and unreduced boron chlorid pass to a condenser 23, in which the boron chlorid not acted upon, is again condensed to the liquid form, and is caught in a suitable vessel 24. The condenser is of the usual form, and a discussion of the same in this connection is unnecessary. The mixture of hydrogen and hydrochloric acid gas passes from the condenser by means of a tube 25 to a chamber 26 containing sodium hydroxid, sodium amalgam, or other substance suitable for combining with the hydrochloric acid. The purified hydrogen passes out by a tube 27, and may be used over again.

Fig. 2 shows a modified form of apparatus in which the mixture of gases to be acted upon is introduced by means of tubes 28, 29 passing centrally through the electrodes. The electrodes proper consist of copper and are water-cooled, similar to the electrodes described in connection with Fig. 1, the circulation of cooling fluid being obtained by providing the electrodes with a central partition extending nearly to the end thereof, and shown best in section as 30 in Fig. 3. The cooling fluid passes in on one side of the partition and out on the other side.

The boron produced as above described is not the material commonly designated as boron, in the technical literature. Moissan made what he called "boron" by reduction of boric anhydrid with magnesium. He described the product as a brownish powder, practically non-conductive for electricity, and vaporizable without fusion. Prior to my own investigation of boron and its compounds, this was the material generally recognized among chemists as boron. I have, however, demonstrated that it is not pure boron at all. If the reaction is carried out as described by investigators preceding Moissan, the product is magnesium borid, containing more or less magnesium; if the reaction is carried out according to Moissan, using an excess of boric anhydrid, a boron sub-oxid is formed mixed with more or less magnesium borid. I have found that pure boron is black, not brown, and that it can be fused into dense bodies having a conchoidal fracture, and a hardness considerably greater than sapphire. Its melting point is about 2000° C. and is not far from 2300° C. Its vapor tension is high. While it has a high resistance when cold, it possesses a negative temperature coefficient of resistance of unprecedented magnitude, so that it acts as a fair conductor of electricity by the natural rise in conductivity due to the heating action of the current.

In an application, Serial No. 700,151 filed May 28, 1912 as a division of the present application, claims are made on boron as an article of manufacture. In my Patent No. 997,879, I have described and claimed the method of making boron by heating in a vacuum the impure boron compound obtainable when boric anhydrid is reduced with magnesium. In Patent No. 1,019,392, I have described and claimed the preparation of boron by thermal treatment of the magnesium reduction product by a high voltage arc operating in hydrogen. In Patent No. 13

1,019,569, I have described and claimed the method of making boron from a mixture of boric halid and hydrogen in contact with a heated surface.

It should be understood that the basic idea of the present application can be utilized in many ways, and that the method in its broadest aspects is not specific to the reduction of boron chlorid by hydrogen but can be applied to halids in general.

In Fig. 4 a modified form of apparatus is illustrated, in which a stream of hydrogen is passed by means of tube 31 over the surface of the liquid boron chlorid 32, which is contained in a vessel surrounded by ice, or other cooling means 33, so as to control its evaporation. The hydrogen carrying with it boron chlorid vapor is passed into a main arc chamber, which is similar to that described in connection with Fig. 1; but in this case the reaction mixture is introduced at the bottom of the chamber, from where it is passed upward through a plurality of arcs formed between water-cooled copper electrodes. Two sets of electrodes, 34, 35 and 36, 37, have been shown; but a greater number can be used. The electrodes are connected in series to the secondary of the high voltage transformer, in the same manner as described in connection with Fig. 1. The reduction of the boron takes place in the same manner, and the description need not be repeated at this point. The unused hydrogen and boron chlorid, and the by-product consisting of hydrochloric acid, pass out of the arc chamber through a tube 38 into an absorption vessel 39 containing sodium hydroxid or sodium amalgam, which combine with the hydrochloric acid. The mixture of boron chlorid and hydrogen, from which the hydrochloric acid has now been removed, pass on by means of the tube 40 to a second arc chamber 41 containing electrodes 42, 43, which likewise consist of copper, and are water-cooled. In this chamber a further reduction of boron chlorid takes place. If desired, the unused hydrogen escaping through outlet tube 44 can be purified in the manner described in connection with Fig. 1, and used over again.

In Fig. 5 is illustrated an apparatus arranged particularly for the reduction of compounds requiring the application of external heat to bring them to a vaporized state. The apparatus is provided with a heating chamber 45, in which a chlorid, such as zirconium chlorid in granular form is placed. The chamber is heated by gas flames from burners 46, or in any other suitable manner, and is provided with an inlet tube 47, through which hydrogen or other reducing gas is admitted for mixing with the vaporized chlorid. The mixture of gases passing out of chamber 45 enters the arc chamber 48, and is there subjected to the action of an alternating current arc maintained between the water-cooled copper electrodes 49, 50. As in the cases heretofore described, the arc blast imparts to the solid reduction product such rapid movement that the particles are quickly removed from the hot zone and are deposited on the walls of the arc chamber, or on the electrodes themselves. Beyond arc chamber 48 there is provided a condenser 51, water-cooled, if desired; but air-cooling will suffice in this case. In this chamber collects any unreduced chlorid. The mixture of hydrogen and hydrochloric acid escaping from this condenser through tube 52 can be purified by passing through an absorbing apparatus 53, containing sodium hydroxid or other suitable material. The hydrogen leaving the absorbing chamber by way of outlet tube 54 can be sebsequently used over again in the cycle of reduction.

What I claim as new and desire to secure by Letters Patent of the United States, is,

1. The method of effecting in a gaseous mixture a chemical reaction normally reversible, which consists in feeding said mixture to an arc capable of supplying the necessary heat and arranged to drive from its heated zone any solid reduction product, thereby preventing the reverse reaction by rapid removal from the active zone of any solid reduction product which might otherwise be attacked.

2. The method of reducing a vaporized halid with hydrogen, which consists in passing a mixture of said materials directly through an arc.

3. The method of reducing a vaporized halid with hydrogen, which consists in feeding a mixture thereof to an arc capable of driving from its heated zone any solid reduction product.

4. The process of producing boron which consists in acting upon boron halid with hydrogen at high temperature.

5. The method which consists in subjecting a mixture of boron halid and a reducing agent to a temperature sufficiently high to initiate a reaction in said mixture, and removing one of the products of the reaction from the reaction zone, with sufficient rapidity to prevent in large part the reverse reaction.

6. The method of producing boron, which consists in passing a mixture of boron chlorid and hydrogen into an arc capable of effecting chemical union between the hydrogen and the chlorin with liberation of pure boron.

7. The method of making pure boron, which consists in passing a mixture of vaporized boron halid and hydrogen into an alternating current arc maintained between cooled electrodes consisting of material inert with respect to boron.

8. The method of producing pure boron, which consists in passing a mixture of boron chlorid and hydrogen into an alternating current arc maintained between water-cooled copper electrodes.

9. The method which consists in passing a mixture of hydrogen and a reducible chlorid into an arc to effect reduction of the chlorid, absorbing the hydrochloric acid resulting from the reaction, and ultimately returning the regenerated hydrogen for use in the reduction of more chlorid.

10. In an apparatus for the reduction of chemical compounds, a vaporizing chamber, means for mixing a reducing gas with material there vaporized, and an arc chamber communicating with said vaporizing chamber, and provided with means for maintaining an arc between electrodes chemically inactive.

11. In an apparatus for the reduction of chemical compounds, the combination of a vaporizing chamber, a hydrogen inlet for said chamber, an arc chamber communicating with said vaporizing chamber, and a means for maintaining an alternating current arc within said arc chamber between electrodes chemically inactive with respect to the materials under treatment.

12. In a reduction apparatus, the combination of a gas tight chamber, means for supplying thereto a vaporized chlorid and a reducing gas, and means for maintaining in said chamber an arc capable of effecting chemical reaction between said vapor and said gas with simultaneous deposition on the walls of said chamber of any solid product resulting from said reaction.

13. In an apparatus for effecting chemical reactions normally reversible with production of a solid product, the combination of a closed arc chamber, means for supplying thereto the reaction mixture, and means within said chamber for effecting the desired reaction with quick removal from the active zone of at least one solid product of said reaction.

14. In an apparatus for the reduction of chemical compounds, a vaporizing chamber, an arc chamber, means for supplying a reducing gas to the vaporizing chamber to transport vaporized material into said arc chamber, means for mixing additional reducing gas with said vaporized material, means for maintaining an arc into which said mixture is fed, and an absorbing chamber into which some of the by products are conducted.

15. In an arc furnace for producing boron, arcing electrodes consisting of a metal of the copper group and means for supplying to said electrodes a gaseous mixture containing a boron halid.

In witness whereof, I have hereunto set my hand this 26th day of October, 1909.

EZECHIEL WEINTRAUB.

Witnesses:
JOHN A. McMANUS, Jr.,
CHARLES A. BARNARD.